United States Patent [19]

Myles et al.

[11] E Patent Number: Re. 32,624

[45] Reissued Date of Patent: Mar. 15, 1988

[54] SHOCK-REDUCING LAMP ASSEMBLY FOR VEHICLES

[75] Inventors: Sam A. Myles, Oak Park; Paul C. Katz, Chicago, both of Ill.

[73] Assignee: Triplex Manufacturing Co., Chicago, Ill.

[21] Appl. No.: 47,977

[22] Filed: May 7, 1987

Related U.S. Patent Documents

Reissue of:

[64] Patent No.: 4,591,961
Issued: May 27, 1986
Appl. No.: 764,831
Filed: Aug. 9, 1985

[51] Int. Cl.[4] ..... F21V 15/04

[52] U.S. Cl. ..... 362/390; 362/369; 362/306

[58] Field of Search ..... 362/390, 369, 306

[56] References Cited

U.S. PATENT DOCUMENTS

| | | | |
|---|---|---|---|
| 3,096,026 | 7/1963 | Bruce et al. | 362/306 |
| 3,114,508 | 12/1963 | Trautner et al. | 362/90 |
| 3,143,301 | 8/1964 | Trautner et al. | 362/311 |
| 3,980,878 | 9/1976 | Crompton | 362/90 |
| 4,100,448 | 7/1978 | Chipner et al. | 313/318 |
| 4,176,391 | 11/1979 | Kulik et al. | 362/390 |
| 4,198,027 | 4/1980 | Urbanek | 362/306 |
| 4,231,081 | 10/1980 | Borruso et al. | 362/306 |
| 4,345,307 | 8/1982 | Mayer et al. | 362/306 |
| 4,390,936 | 6/1983 | Slater, Jr. et al. | 362/390 |

*Primary Examiner*—E. Rollins Cross
*Attorney, Agent, or Firm*—Fitch, Even, Tabin & Flannery

[57] ABSTRACT

A shock-reducing lamp assembly adapted for mounting on a vehicle. The assembly includes a housing defining a cavity having an open end and a lens connected to the housing enclosing the open end. An integral resilient mount includes a tubular central portion having a first end and a second end, with a pair of spaced mounting feet disposed adjacent to the first end and a second pair of spaced mounting feet positioned adjacent the second end. Each of the feet has a mounting aperture and the first pair of feet extends in a first plane and the second pair of feet extends in a second plane, with the first and second planes being spaced and being substantially parallel. The assembly further includes a metallic socket telescopically received in the central portion. The housing includes components for positioning the mount so that a lamp held in the socket is in operative relationship to the lens.

17 Claims, 9 Drawing Figures

SHOCK-REDUCING LAMP ASSEMBLY FOR VEHICLES

Matter enclosed in heavy brackets [ ] appears in the original patent but forms no part of this reissue specification; matter printed in italics indicates the additions made by reissue.

The present invention relates to vehicular lighting and, more particularly, to a shock-reducing lamp assembly which greatly lessens shock and vibration transmitted to the filament of the bulb.

BACKGROUND OF THE INVENTION

Shocks due to irregularities in the road and engine vibration, both of which are transmitted to a bulb through the vehicle frame, are primary causes of bulb failure due to breakage of the relatively delicate bulb filaments. Bulb failure, particularly at the rear of the vehicle, may not be immediately apparent to the vehicle operator. The loss of the ability to signal following vehicles as to turning and braking presents a danger and often results in a violation of the law. [Occassionally] *Occasionally*, even if the bulb failure is known, the replacement is not immediate. Thus, it is always desirable to extend bulb life.

Various lamp assemblies have been proposed incorporating resilient insulative bulb mounts. In one assembly, the mount (which is suspended between a pair of posts) holds the bulb directly, no metallic socket is employed. This requires that the contact for each filament, as well as the metallic base of the bulb, be soldered to lead wires. Such an arrangement makes it difficult if not functionally impossible to replace a bulb, particularly if the vehicle is on the road when replacement is desired. For further information regarding the structure and operation of such a mount, reference may be made to U.S. Pat. No. 4,390,936.

U.S. Pat. No. 3,980,878 is directed to a lamp assembly including a resilient isolation mount having lateral side portions held in cavities with the cavities closed by overlying plates having apertures receiving pins. The metal socket used with the mount has portions at its bulb-receiving end which must be bent to retain the socket in the mount.

Other vehicular lamp assemblies include resilient mounts which are of relatively massive construction, have supports adjacent only one end of the mount and require the use of relatively complex socket or contact structures. Such sockets or contacts may be difficult to insert in the mounts and may not be removable without damage to the mounts. Furthermore, crimping or soldering is required for connection of the ground conductor. For further information regarding the operation and structure of such mounts and sockets, reference may be made to U.S. Pat. Nos. 3,114,508; 3,143,301 and 4,176,391.

SUMMARY OF THE INVENTION

Among the several aspects and features of the present invention may be noted the provision of an improved shock-reducing lamp assembly for vehicles. The assembly includes a resilient bulb mount which is supported at spaced locations adjacent its first end and at spaced locations adjacent its second end to provide extremely stable support and shock insulation for the bulb. The metallic socket used in the assembly provides a quickdisconnect terminal which can be bent to fix the socket with the mount. The socket is easily mated with the mount and a single socket design can be used with a variety of mount configurations. The assembly is made up of relatively few parts, can be quickly and easily fit together and permits fast and convenient bulb replacement. The assembly is reliable in use, offers long service life and is simple and economical to manufacture. Other objects and features will be, in part, apparent and, in part, pointed out specifically in the following specification and accompanying drawings and claims.

Briefly, a shock-reducing lamp assembly embodying various features of the present invention includes an integral resilient mount having a generally tubular central portion with first and second ends and a pair of spaced mounting feet disposed adjacent each end. The feet lie in planes which are spaced but parallel to one another. A metallic socket is telescopically received in the tubular central portion of the mount and holds a lamp. The assembly further includes a housing holding the mount positioned so that the lamp is in operative relationship to a lens connected to the housing. A plurality of pins extend from standards on the housing toward the open end of the housing with a pin received in the aperture of each foot.

BRIEF DESCRIPTION OF THE DRAWINGS

Corresponding reference numbers indicate corresponding components throughout the several views of the drawings.

DESCRIPTION OF THE PREFERRED EMBODIMENT

Figure 1:
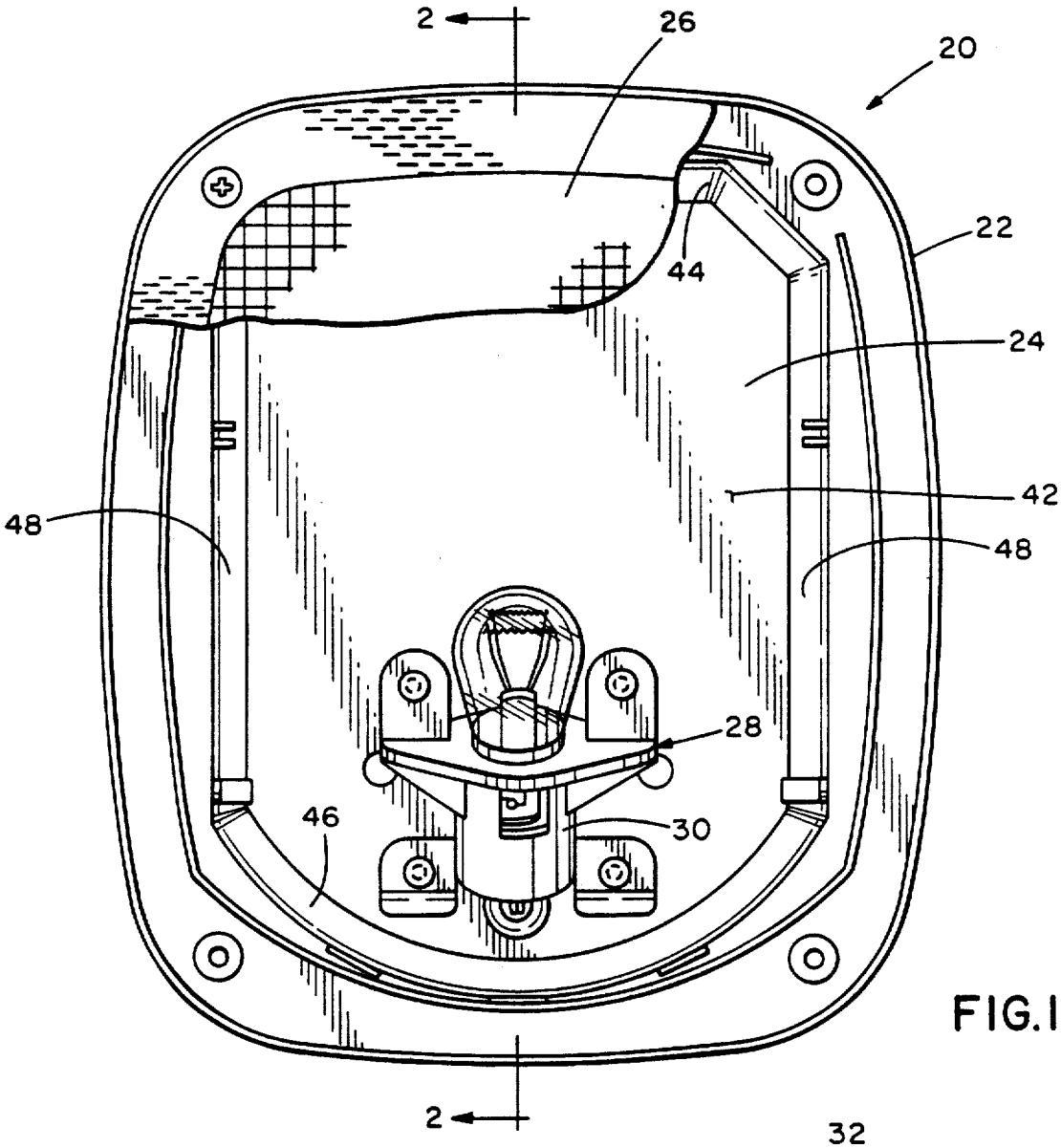
FIG. 1 is a front elevational view of a lamp assembly embodying various features of the present invention with certain components broken away to expose other components.
Figure 2:
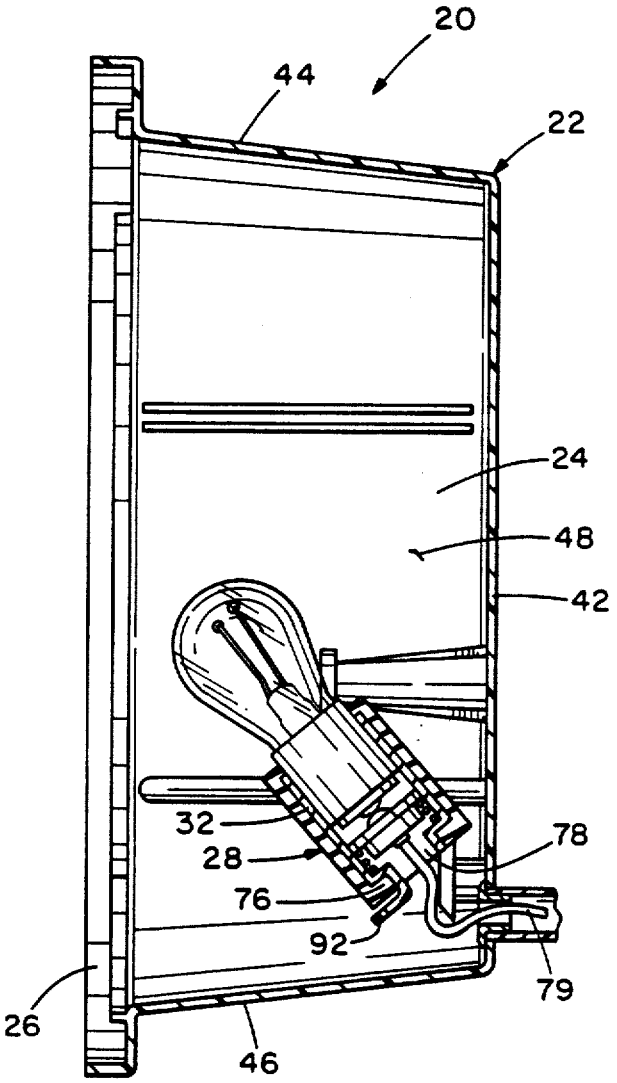
FIG. 2 is a sectional view taken generally along line 2—2 of FIG. 1.

Referring now to the drawings, a [shock-resistent] *shock-resistant* lamp assembly for a vehicle is generally indicated in FIGS. 1 and 2 by reference character 20. The lamp assembly includes a housing 22 defining a cavity 24 with an open end, and a generally planar lens 26 connected to the housing and closing the cavity open end. A resilient, electrically insulative, shock absorbing mount 28 is supported inside the cavity and includes a tubular central portion 30 telescopically receiving a metallic socket 32 which, in turn, receives and holds the metallic base 33 of a lamp 34. The lamp 34 has a glass envelope 36 which may enclose a pair of elongated filaments, 38, 40. The outer filament 38 could be of a higher brightness and used to indicate application of the brakes and signal the intention to turn. On the other hand, the inner filament 40 could be of a lower brightness and function as a running light. These filaments which are relatively delicate, are subject to damage as a result of shock, vibration and harmonic distortion. The lamp assembly of the present invention, with its resilient mount 28, serves to reduce the shock, vibration and distortion caused by road irregularities and engine operation to prolong the operational life of the lamp.

More specifically, the housing 22 includes a back mounting wall 42 and upper, lower and lateral side walls 44, 46 and 48, respectfully, extending from the back wall and defining therewith the cavity 24. The housing 22 includes mounting means for positioning the mount 28 so that the bulb 34 is in operative relationship to the lens 26. The mounting means preferably includes a pair of upper standards 50 and a pair of lower standards 52. Each of the standards terminates in a mounting pin 54 extending towards the open end of the cavity 24. It will be appreciated that the upper standards 50 have a common length which is somewhat greater than the common length of the lower standards 52. The various lengths can be adjusted depending upon the focal length required for a particular lens configuration to promote photometric efficiency.

Figure 3:
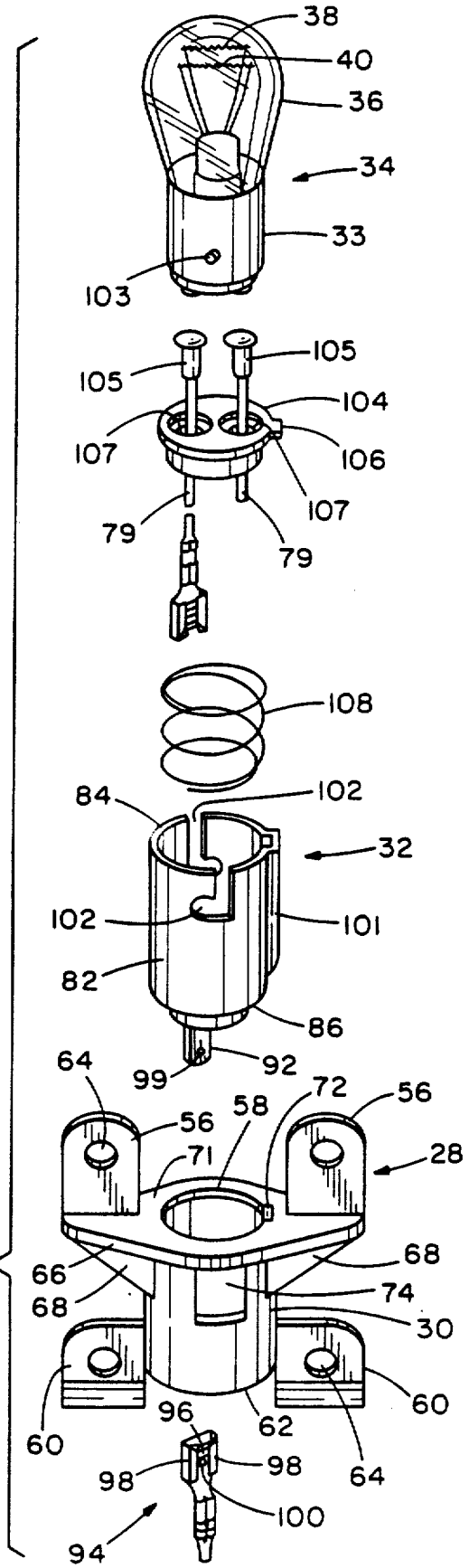
FIG. 3 is an exploded perspective view of certain components of the assembly including a bulb socket and a mount.
Figure 6:
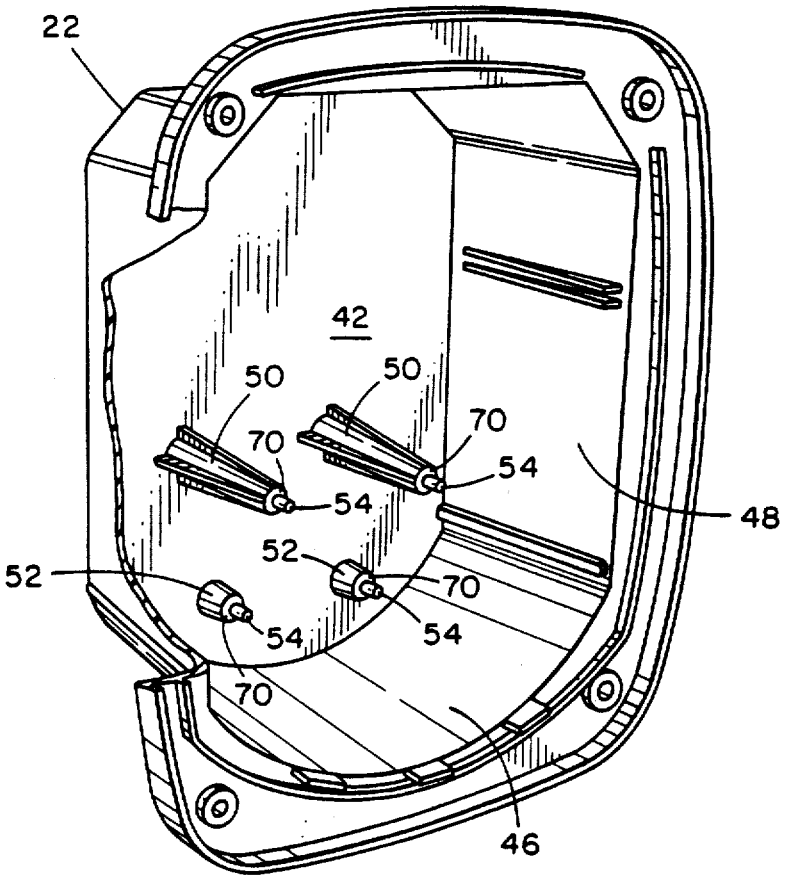
FIG. 6 is a perspective view of a housing included in the assembly.
Figure 7:
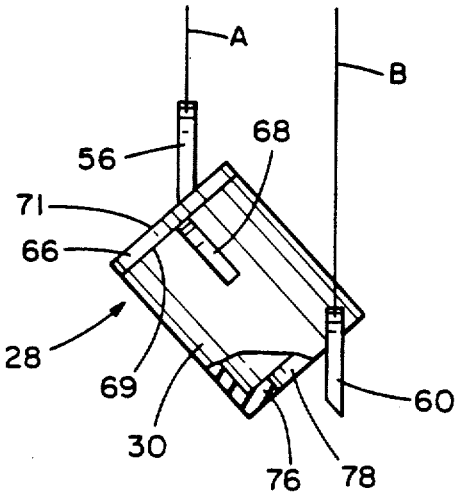
FIG. 7 is a side elevational view of the mount with certain components broken away to expose other components.

The mount 28, preferably formed of synthetic rubber, is best shown in FIGS. 3 and 7 and includes a pair of spaced apart mounting feet 56 disposed adjacent a first or upper end 58 of the tubular central portion, and further comprises a second pair of mounting feet 60 disposed adjacent the second or lower end 62 of the tubular central portion. Each of the feet is provided with a mounting aperture 64 for reception of a corresponding mounting pin 54. The first pair of feet 56 extend in a first plane A and the second pair of feet 60 extend in a second plane B with the first and second planes being spaced and substantially parallel as best shown in FIG. 7. This provides extremely easy disposition of the mount 28 on the standards extending from the back wall 42 because the mount can simply be directly inserted from the open end of the cavity 24 and pushed over the various pins to properly locate the mount 28.

The mount includes a flange 66 at the upper end 58 extending normally to the axial direction of the tubular central portion 30. Reinforcing ribs 68 interconnect the tubular portion 30 and one surface 69 of the flange 66, with the mounting feet 56 extending from an opposite surface 71 of the flange. It will be appreciated that each of the upper and lower standards 50 and 52, respectively, has an abutment surface 70 for engaging and limiting inward movement of a corresponding foot of the mount 28. The tubular central portion 30 has an axially extending internal groove 72 for receiving a component of the socket 32 to prevent rotation of the socket once it is positioned in the mount. The central portion also include an observation window 74 therethrough to permit inspection of the proper orientation of the lamp 34 in the socket 32. At the lower end 62 of the tubular central portion, as shown in FIG. 2, a constricted throat 76 is provided for limiting insertion of the socket. The throat 76 defines a central aperture 78 for exit of insulated conductors 79 electrically connected to the lamp.

The flange 66 and reinforcing ribs 68 disposed at the upper end 58 of the tubular central portion 30 provide sufficient strength that the assembler can place his fingers behind the ribs and insert the socket 32 into the tubular central portion without collapsing the mount. The mounting feet 60 at the lower end 62 are less rigid but prevent substantial rotational movement of the mount. The mount 28 offers spaced support at both ends thereof which increases the stability of the positioned lamp 34 to protect the filaments 38, 40.

Figure 4:
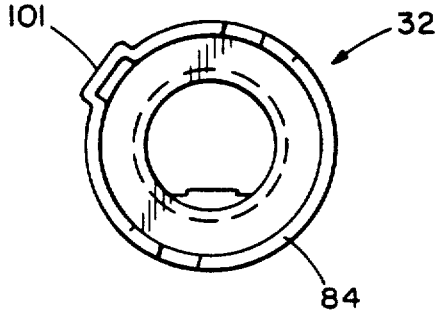
FIG. 4 is a front elevational view of the socket.
Figure 5:
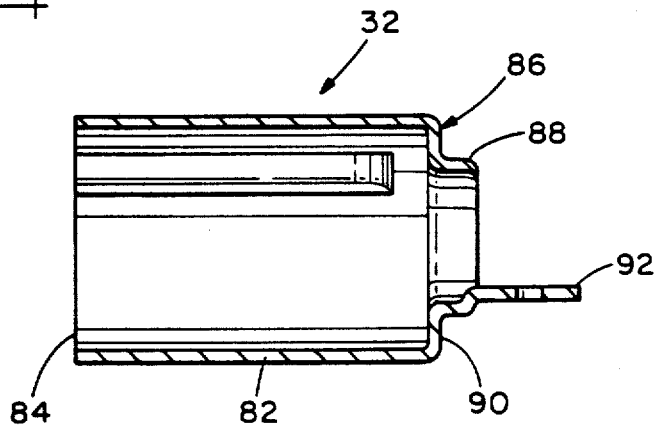
FIG. 5 is an axial cross-sectional view of the socket.

The metallic socket 32 is best shown in FIGS. 3, 4 and 5, and comprises a main bulb-receiving portion 82 with a lamp-receiving end 84 and an abutment end 86 for engaging the constricted throat 76 of the mount. The abutment end 86 of the socket has a tubular extension 88 for reception in the throat aperture 78, and a transitional portion 90 [interconntecting] *interconnecting* the extension 88 and the main portion 82 for contacting the throat 76. The extension 88 and aperture 78 are preferably of equal length so that when the socket 32 is seated, the constricted throat and extension are coterminous. The socket 32 further includes a male terminal 92 adapted for reception by a female terminal 94, shown in FIG. 3, with the male terminal 92 extending axially from the tubular extension 88, beyond the throat 76. The male terminal is bendable from its first position (shown in FIG. 5) wherein it extends in the axial direction of the socket 32, to a second position, shown in FIG. 2, wherein it extends outwardly transversely to the axial direction of the socket so that the throat 76 is captured between the abutment end 86 and the male terminal to retain the socket in the mount.

The female terminal 94, for connection with the male terminal, includes a floor 96 from which laterally oppositely extend a pair of spring arms 98 which are bent upwardly and then have their free ends directed toward the floor 96 to define therewith an opening for receiving the male terminal 92 in an interference fit. The floor preferably has a protuberance 100 for reception within an aperture 99 in the male terminal 92, to provide a detent once the female terminal 94 has fully received the male terminal.

The main bulb-receiving portion 82 of the socket includes an axial channel-shaped rib 101 for reception in the groove 72 in the cylindrical inner surface of the tubular portion 30 of the mount 28. The main portion 82 also includes cutouts 102 of the bayonet type for lockingly receiving lateral studs 103 extending from the base 33 of the lamp 34. As is standard for dual filament lamps, the studs 103 are at different levels and the bayonet cutouts 102 are at corresponding different locations to achieve a polarization of the lamp 34 so that standard connections can be made to the high and low filaments 38, 40. The socket 32 is preferably formed of cold roll steel with a zinc dichromate coating for corrosion protection.

As shown in FIG. 3, the bulb-receiving portion 82 receives [a] *an* insulative disk 104 having a laterally extending tongue 106 for reception in the channel 101 formed in the socket 32, to prevent rotation of the disk. Countersunk holes 107 are provided in the disk 104 for receiving and seating metallic contacts 105 which are connected to leads 79 extending through the aperture 78 in the constricted throat 76. Biasing means such as a compression spring 108 is disposed between the disk and the transitional portion 90 to bias the disk towards the bulb-receiving end 84 of the socket. This maintains the contacts carried by the disk 104 in good electrical and mechanical engagement with the contacts at the base of the lamp 34.

Installation of the mount 28 on the standards 50, 52 can be achieved by simply installing the mount from the open end of the cavity 24 so that the various apertured feet 56, 60 are aligned with the corresponding upper and lower standards 50, 52. Upon direct rearward movement of the mount, the mounting pins 54 are received in the apertures 64. The mount can be fixed in various ways. For example, Tinnerman locking washers can be positioned over the pins 54 to hold the feet. In the event that the feet are molded with embedded washers, the distal ends of the various mounting pins 54 can be enlarged by, for example, sonic welding or by peening to lock the mount in position.

Figure 8:
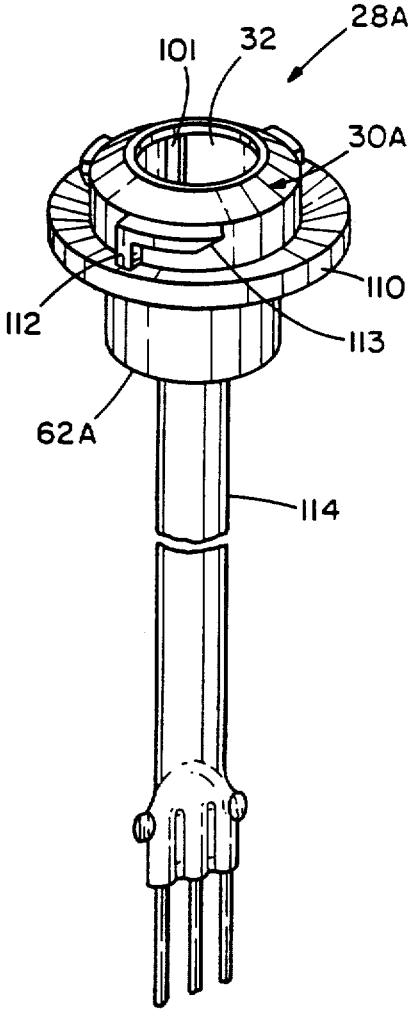
FIG. 8 is a perspective view of an alternative embodiment of the mount of the present invention holding the socket of FIGS. 4 and 5 with a boot sonically welded to provide a moisture-proof exit for conductors.

Referring to FIG. 8, an alternate embodiment of the mount 28 of the present invention is shown at reference character 28A. Components of mount 28A corresponding to those of mount 28 are indicated by the reference numeral assigned to the component of mount 28 with the addition of the suffix "A". The mount 28A is of the twist-lock type wherein the tubular central portion 30A has a collar 110 about which various mounting protuberances 112 are positioned. Each protuberance 112 includes a ramp surface 113 for cooperation with a corresponding protuberance in a housing for locking the mount 28A with a twisting action, as is well-known to those of skill in the art. Extending from the lower end 62A of the central portion 30A is a tubular boot 114 for receiving insulated conductors attached to the contacts 105A held by the disk 104A and the conductor carrying the female disconnect 94 for receiving the male terminal 92. As shown in FIG. 8, the boot can be closed about the various conductors attached to the contacts held by the insulative disk and attached to the female terminal receiving the male terminal, by sonically welding the boot 112 thus providing a moisture-proof exit for these conductors.

Figure 9:
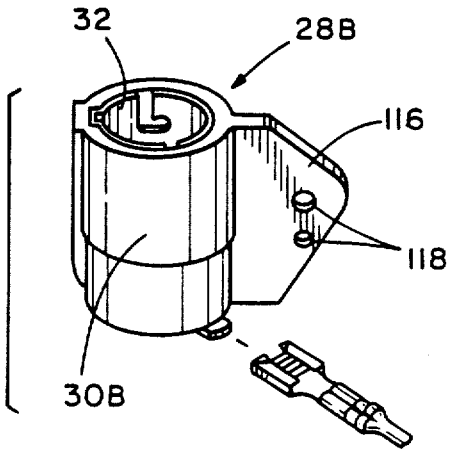
FIG. 9, similar to FIG. 8, illustrates another alternative embodiment of the mount which also receives the socket of FIGS. 4 and 5.

Another alternative embodiment of the mount of the present invention is indicated by reference character 28B in FIG. 9. Components of mount 28B corresponding to those of mount 28 are indicated by the reference numeral assigned to the component of mount 28 with the addition of the suffix "B". The mount 28B also includes a tubular central portion 30B. Extending from the central portion is a laterally extending mounting fin 116 having apertures 118 for receiving fastening means to mount the fin supporting structure. It will be appreciated that the resilient mounts 30, 30A, and 30B are of different configurations. However, the respective tubular central portions thereof are substantially identical and can receive the same socket 32. Thus mounts having different configurations are usable with a common socket. This reduces the number of different parts needed to complete different types of mounting assemblies.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A shock-reducing lamp assembly adapted for mounting on a vehicle, said assembly comprising:

a housing defining a cavity having an open end;

a lens connected to said housing and closing said open end;

an integral resilient mount including a generally tubular central portion having a first end and a second end with a first pair of spaced mounting feet disposed adjacent said first end and a second pair of spaced mounting feet positioned adjacent said second end, each of said feet having a mounting aperture, said first pair of feet extending in a first plane and said second pair of feet extending in a second plane with said first and second planes being spaced and substantially parallel; and a metallic socket for holding a lamp and telescopically received in said tubular central portion, said housing including mounting means for positioning said mount so that said lamp is in operative relationship to said lens, said mounting means comprising a plurality of pins extending toward said open end corresponding in number to said feet with a pin received in the aperture of each foot.

2. An assembly as set forth in claim 1 wherein said lens is substantially planar, said mounting means further comprising abutment means associated with each pin for engaging and locating a corresponding foot of said mount, said abutment means being positioned such that said first and second planes are generally parallel to the plane of said lens.

3. An assembly as set forth in claim 2 wherein said housing comprises a back mounting wall and upper, lower and lateral side walls extending from said back wall and defining therewith said cavity, said mounting means including a pair of upper standards and a pair of lower standards with said upper standards carrying said pins for supporting said first pair of feet and said lower standards carrying said pins for supporting said second pair of feet.

4. An assembly as set forth in claim 3 wherein said upper pair of standards extend closer to said lens than do said lower pair of standards.

5. An [assemby] *assembly* as set forth in claim 3 wherein said abutment means comprises a surface at the distal end of each standard with the pin carried by each standard extending beyond the abutment surface of its corresponding standard.

6. An assembly as set forth in claim 1 wherein said mount has a flange at said first end disposed in a plane extending normal to the axis of said tubular central portion with said flange carrying said first pair of mounting feet on one surface of said flange.

7. An assembly as set forth in claim 6 wherein said mount comprises a pair of reinforcing ribs interconnecting said central portion and a surface of said flange opposite said one surface.

8. An assembly as set forth in claim 1 wherein said mount has a constricted throat at said second end for limiting inserting of said socket and defining an aperture for exit of at least one insulated conductor electrically connected to said lamp.

9. An assembly as set forth in claim 8 wherein said tubular central portion has a generally cylindrical inner surface including an axially extending anti-rotation slot for receiving a component of said socket, said lamp including a first filament and a second filament.

10. An assembly as set forth in claim 8 wherein said socket has a main bulb-receiving portion with a bulb-receiving end and an abutment end for engaging said constricted throat, said abutment end carrying a male terminal, adapted for reception by a female terminal, said male terminal extending beyond said throat and being bendable from a first position wherein it extends in the axial direction of said socket, to a second position wherein it extends outwardly transversely to said axial direction to capture said throat.

11. An assembly as set forth in claim 10 wherein said abutment end comprises a tubular extension positioned in said throat aperture and a transitional portion interconnecting said extension with said main portion.

12. In combination, an integral resilient mount and a metallic socket for reception of an automotive lamp, telescopically disposed in said mount, said mount comprising:

a tubular central portion having a socket-receiving end and an abutment end having a constricted throat defining a central aperture, said socket comprising:

a main bulb-receiving portion, a bulb-receiving end and an abutment end for engaging said throat, said abutment end carrying a male terminal element extending beyond said throat for reception by a female terminal.

13. A combination as set forth in claim 12 wherein said mount comprises attachment means for joining said mount to a support.

14. A combination as set forth in claim 12 wherein said mount further includes a tubular boot extending from said throat away from said central portion and beyond said male terminal.

15. An integral shock isolation mount formed of a resilient insulative material for use in a mounting assembly for a vehicular lamp, said mount comprising:

a tubular central portion for receiving a metallic socket, said portion having a first end and a second end;

a first pair of spaced mounting feet disposed adjacent said first end; and a second pair of spaced mounting feet disposed adjacent said second end, each foot having a pin-receiving aperture, said first pair of legs extending in a first plane and said second pair of legs extending in a second plane, said planes being spaced and being substantially parallel.

*16. An integral shock isolation mount formed of a resilient insulative material for use in a mounting assembly for a vehicular lamp, said mount comprising:*

*a central portion having a central opening in which is disposed metallic means for establishing electrical contact with said lamp, said portion having a first end and a second end;*

*a first pair of spaced mounting feet disposed adjacent said first end; and*

*a second pair of spaced mounting feet disposed adjacent said second end, said foot having a pin-receiving aperture, said first pair of legs extending in a first plane and said second pair of legs extending in a second plane, said planes being spaced and being substantially parallel.*

*17. In combination, an integral resilient mount formed of insulative material and a metallic contact means for holding and establishing electrical contact with a vehicular lamp, said mount comprising:*

*a central portion having a central opening in which said metallic contact means is disposed, said portion having a first end and a second end;*

*a first pair of spaced mounting feet disposed adjacent said first end; and*

*a second pair of spaced mounting feet disposed adjacent said second end, each foot having a pin-receiving aperture, said first pair of legs extending in a first plane and said second pair of legs extending in a second plane, said planes being spaced and being substantially parallel.*

* * * * *

UNITED STATES PATENT AND TRADEMARK OFFICE

CERTIFICATE OF CORRECTION

PATENT NO. : Re. 32,624

DATED : March 15, 1988

INVENTOR(S) : Sam A. Myles et al.

It is certified that error appears in the above-identified patent and that said Letters Patent is hereby corrected as shown below:

Column 8, line 17, "said", second occurrence, should read -- each --.

Signed and Sealed this

Second Day of August, 1988

*Attest:*

DONALD J. QUIGG

*Attesting Officer*

*Commissioner of Patents and Trademarks*